UNITED STATES PATENT OFFICE.

BENEDICT TREUTLER, OF DALE, PENNSYLVANIA, ASSIGNOR TO HIMSELF AND SAMUEL W. WEISS, OF SAME PLACE.

IMPROVEMENT IN THE PROCESS OF MANUFACTURING STEEL.

Specification forming part of Letters Patent No. 27,025, dated January 31, 1860.

*To all whom it may concern:*

Be it known that I, BENEDICT TREUTLER, of Dale, in the county of Berks and State of Pennsylvania, have invented certain new and useful Improvements in the Process of Manufacturing Steel; and I do hereby declare that the following is a full, clear, and exact description of the operation of the same.

The nature of my invention consists in the use of cyanide of potassium, salammoniac, and borax, which are mixed with the powdered charcoal used in manufacturing shear-steel by the process of case-hardening, and which, when used in varied proportions, impart to said steel varied degrees of hardness or softness.

To enable others skilled in the art to make and use my discovery, I will proceed to describe the compound as well as the mode of using it.

The dry mixture which I use for carbonizing the wrought-iron for converting it into steel consists of powdered charcoal mixed with one pound and a half of cyanide of potassium, two pounds of salammoniac, and one and a half pound of borax to about one hundred pounds of wrought-iron, said ingredients being all powdered finely.

The iron to be used for this process may be worked under the hammer into bars of about one-eighth of an inch thick and two inches wide. These bars are cut in pieces of convenient length, and are packed in the above-described mixture in iron boxes in the usual way. The quantity of charcoal to be used in this process is not material, provided it covers or surrounds each bar separately. The boxes being filled with the iron and the compound, are then closed tightly, and are heated by a charcoal fire to a white heat for a period of several days—say seven or eight—and when the above ingredients are used in the described proportions the iron will be converted into steel of the usual hardness.

By this process I have been enabled to make steel of the best quality from American iron, the peculiar advantages of my process being that I can adapt the above-described mixture to iron of different qualities by changing the proportions of the ingredients, as the individual properties of them are as follows, so far as I can judge and believe from my experiments and the product, viz: The cyanide of potassium renders the steel hard, the salammoniac will render it tenacious, and the property of the borax is to act on the metallic oxides and to produce a steel which can be welded easily and repeatedly, the latter being an important item in the process of refining the steel, as without it no fine steel can be produced.

Having thus fully described my process and the ingredients and their proportions for reducing it to practice, what I claim therein as new, and desire to secure by Letters Patent, is—

In connection with pulverized charcoal, the cyanide of potassium, salammoniac, and borax, as herein stated, the whole being used in the manner substantially as herein set forth.

BENEDICT TREUTLER.

Witnesses:
A. B. STOUGHTON,
E. COHEN.